(12) United States Patent
Ito et al.

(10) Patent No.: US 7,922,803 B2
(45) Date of Patent: Apr. 12, 2011

(54) COATING COMPOSITION AND RESIN MULTILAYER BODY

(75) Inventors: Kazuhiko Ito, Ichihara (JP); Mitsugu Nakae, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 12 days.

(21) Appl. No.: 12/470,964

(22) Filed: May 22, 2009

(65) Prior Publication Data

US 2009/0233076 A1     Sep. 17, 2009

Related U.S. Application Data

(62) Division of application No. 11/573,104, filed as application No. PCT/JP2005/015466 on Aug. 25, 2005.

(30) Foreign Application Priority Data

Aug. 26, 2004   (JP) ................................ 2004-246422
May 31, 2005   (JP) ................................ 2005-158501

(51) Int. Cl.
C09D 183/04    (2006.01)
B32B 9/04    (2006.01)

(52) U.S. Cl. .................... 106/287.16; 428/447

(58) Field of Classification Search ............. 524/91; 106/287.16
See application file for complete search history.

(56) References Cited

U.S. PATENT DOCUMENTS

| | | | |
|---|---|---|---|
| 3,881,043 A * | 4/1975 | Rieser et al. ................. | 428/81 |
| 3,956,419 A | 5/1976 | Murray | |
| 4,258,146 A | 3/1981 | Balanson et al. | |
| 4,316,033 A | 2/1982 | Ching | |
| 4,600,632 A | 7/1986 | Paul et al. | |
| 5,025,049 A | 6/1991 | Takarada et al. | |
| 5,032,657 A | 7/1991 | Gomez et al. | |
| 5,134,191 A | 7/1992 | Takarada et al. | |
| 5,202,404 A | 4/1993 | Takarada et al. | |
| 5,458,924 A * | 10/1995 | Kashiwai et al. ........... | 427/389.9 |
| 6,432,191 B2 * | 8/2002 | Schutt .................... | 106/287.13 |
| 6,645,910 B1 * | 11/2003 | Sato et al. .................. | 503/209 |
| 6,670,010 B2 | 12/2003 | Nagamoto et al. | |
| 7,211,330 B2 | 5/2007 | Putzer | |
| 2002/0018886 A1 | 2/2002 | Matsufuji et al. | |
| 2004/0071998 A1 | 4/2004 | Higuchi et al. | |
| 2008/0193680 A1 | 8/2008 | Takahashi et al. | |
| 2009/0011256 A1 | 1/2009 | Ito et al. | |

FOREIGN PATENT DOCUMENTS

| | | |
|---|---|---|
| JP | 7-90224 | 4/1995 |
| JP | 2000-272071 | 10/2000 |
| JP | 2002-256248 | 9/2002 |
| JP | 2003-82272 | 3/2003 |
| JP | 2003-531924 | 10/2003 |
| JP | 2003-342905 | 12/2003 |
| JP | 2004-1393 | 1/2004 |
| JP | 2004-131549 | 4/2004 |
| WO | WO 01/64804 | 9/2001 |

* cited by examiner

*Primary Examiner* — Randy Gulakowski
*Assistant Examiner* — Robert Loewe
(74) *Attorney, Agent, or Firm* — Oblon, Spivak, McClelland, Maier & Neustadt, L.L.P.

(57) ABSTRACT

A transparent cured film including organic fine particles having an ultraviolet absorbing group and an average particle diameter of 1 to 200 nm, the particles being dispersed in a matrix having an Si—O bond, and having a transmittance of visible light of 80% or more and a haze value of 10% or less. The coating composition can be produced, for example, from a coating composition containing (1) an alkoxysilane compound or polyalkoxysilane compound; (2) an aminosilane compound; (3) an epoxysilane compound; (4) a polymer ultraviolet absorber; (5) a curing catalyst; and (6) a solvent.

19 Claims, 1 Drawing Sheet

COATING COMPOSITION AND RESIN MULTILAYER BODY

CROSS REFERENCE TO RELATED APPLICATIONS

This application is a divisional of U.S. application Ser. No. 11/573,104, filed Feb. 2, 2007, which is the National Stage of PCT/EP2005/15466, filed Aug. 25, 2005, which claims priority to the following Japanese applications: 2004-246422 filed Aug. 26, 2004; and 2005-158501, filed May 31, 2005.

TECHNICAL FIELD

The invention relates to a transparent cured film, a coating composition, and a resin multilayer body which is surface-treated with the composition.

BACKGROUND ART

Thermoplastics, in particular, polycarbonate resins are widely used as a structural material replacing glass due to excellent transparency, light weight, and improved impact strength. However, application of the polycarbonate resins is limited since the polycarbonate resins exhibit poor surface properties such as scratch resistance, weatherability, and chemical resistance. Therefore, there is a strong demand for improvement of the surface properties of a polycarbonate resin substrate.

As a method of improving the surface properties of a polycarbonate resin molded product, a method of coating the surface of the molded product with a surface treatment agent is known. For example, forming a cured layer of a polyfunctional acrylic photocurable resin, a melamine or organopolysiloxane thermosetting resin on the surface of a polycarbonate resin substrate has been proposed.

Of these, a polycarbonate resin coated with an organopolysiloxane is considered to be useful due to excellent scratch resistance and chemical resistance. However, since the organopolysiloxane has insufficient adhesion to the polycarbonate resin, peeling of the coating layer occurs when used outside for a long time.

As a method of improving adhesion, Patent Document 1 and the like propose mixing various polymers having excellent adhesion in a coating liquid. Mixing such a polymer may cause scratch resistance to deteriorate, and may significantly lower the weatherability of the coating liquid in some cases. Therefore, in applications where scratch resistance and weatherability are required, it is common to use a double coating method including applying an acrylic coating liquid to a polycarbonate resin substrate as a primer and providing a coating layer thereon. However, the double coating method exhibits reduced productivity due to the long working process. Therefore, development of a single coating method is awaited.

Patent Document 2 proposes a method of providing abrasion resistance and adhesion by a single coating method. In this method, it is preferable to use at least one of epoxy group-containing silane coupling agents and amino group-containing silane coupling agents. The silane coupling agent is used in an amount of 5 to 10 parts by weight for 100 parts by weight of the nonvolatile components (JIS K5401) of the coating liquid. The document describes that if the amount of the silane coupling agent is less than 5 parts by weight, film properties and adhesion may deteriorate, and if the amount of the silane coupling agent exceeds 10 parts by weight, abrasion resistance may deteriorate.

As described in Example 6 of Patent Document 2, when a polycarbonate which is not or is insufficiently provided with resistance to ultraviolet rays is used as a substrate, the resulting polycarbonate resin multilayer body may have lowered weatherability and suffers from problems such as peeling of the coating layer.

Patent Document 3 discloses a composition containing a silicone-containing polymer ultraviolet absorber and a polyorganosiloxane. However, it is impossible to obtain a stable dispersion by merely mixing a polymer ultraviolet absorber and a polyorganosiloxane.
[Patent Document 1] JP-A-7-90224
[Patent Document 2] JP-A-2000-272071
[Patent Document 3] JP-A-2004-1393

In view of the above problems, an object of the invention is to provide a transparent cured film exhibiting sufficient adhesion to a polycarbonate resin substrate without using a primer and having excellent scratch resistance and weatherability, a coating composition, and a resin multilayer body.

DISCLOSURE OF THE INVENTION

According to the invention, the following transparent cured film, coating composition, and resin multilayer body are provided.
1. A transparent cured film comprising organic fine particles having an ultraviolet absorbing group and an average diameter of 1 to 200 nm, the particles being dispersed in a matrix having an Si—O bond, and having a transmittance of visible light of 80% or more and a haze value of 10% or less.
2. The transparent cured film according to 1 wherein the volume fraction of the organic fine particles in the transparent cured film is 0.5 to 70 vol %.
3. The transparent cured film according to 1 or 2 wherein $SiO_2$-reduced weight derived from Si contained in the transparent cured film is 30 to 80 wt % of the total weight of the transparent cured film.
4. A resin multilayer body obtainable by forming the transparent cured film of any of 1 to 3 on a resin substrate.
5. A coating composition comprising the following components (1) to (6):
   (1) an alkoxysilane compound or polyalkoxysilane compound;
   (2) an aminosilane compound;
   (3) an epoxysilane compound;
   (4) a polymer ultraviolet absorber;
   (5) a curing catalyst; and
   (6) a solvent.
6. The coating composition according to 5 wherein the amount of the alkoxysilane compound or polyalkoxysilane compound (1) is 10 to 90 wt %;
   the amount of the aminosilane compound (2) is 1 to 55 wt %;
   the amount of the epoxysilane compound (3) is 1 to 60 wt %;
   the amount of the polymer ultraviolet absorber (4) is 0.1 to 65 wt %;
   the amount of the curing catalyst (5) is 0.1 to 30 wt %; and
   the amount of the solvent (6) is 10 to 1000 parts by weight for 100 parts by weight of the total amount of the components (1) to (5).
7. The coating composition according to 5 or 6 wherein the curing catalyst is an organic acid.
8. A cured product obtained by curing the composition according to any one of 5 to 7.

9. A method of producing a coating composition comprising mixing the following components (1) to (6):
  (1) an alkoxysilane compound or polyalkoxysilane compound;
  (2) an aminosilane compound;
  (3) an epoxysilane compound;
  (4) a polymer ultraviolet absorber;
  (5) a curing catalyst; and
  (6) a solvent.
10. The method according to 9 comprising:
  preparing a first mixed solution comprising at least the components (1) and (4);
  preparing a second mixed solution comprising at least the components (1), (2), and (3); and
  mixing the first mixed solution and the second mixed solution.
11. A method for producing a cured film comprising curing the coating composition according to any one of 5 to 7 by heating.

According to the invention, a transparent cured film exhibiting sufficient adhesion to a transparent substrate (particularly polycarbonate resin substrate) and having excellent scratch resistance and weatherability, a coating composition, and a resin multilayer body can be provided.

Further, the resin multilayer body of the invention is useful as a structural material replacing glass since a polycarbonate resin multilayer body can be formed without using a primer layer, which leads to reduction in cost.

In addition, it is expected that the resin multilayer body of the invention has an effect of keeping insects away by blocking ultraviolet rays to eliminate a wavelength in the ultraviolet region detectable by various insects.

BEST MODE FOR CARRYING OUT THE INVENTION

Figure 1:
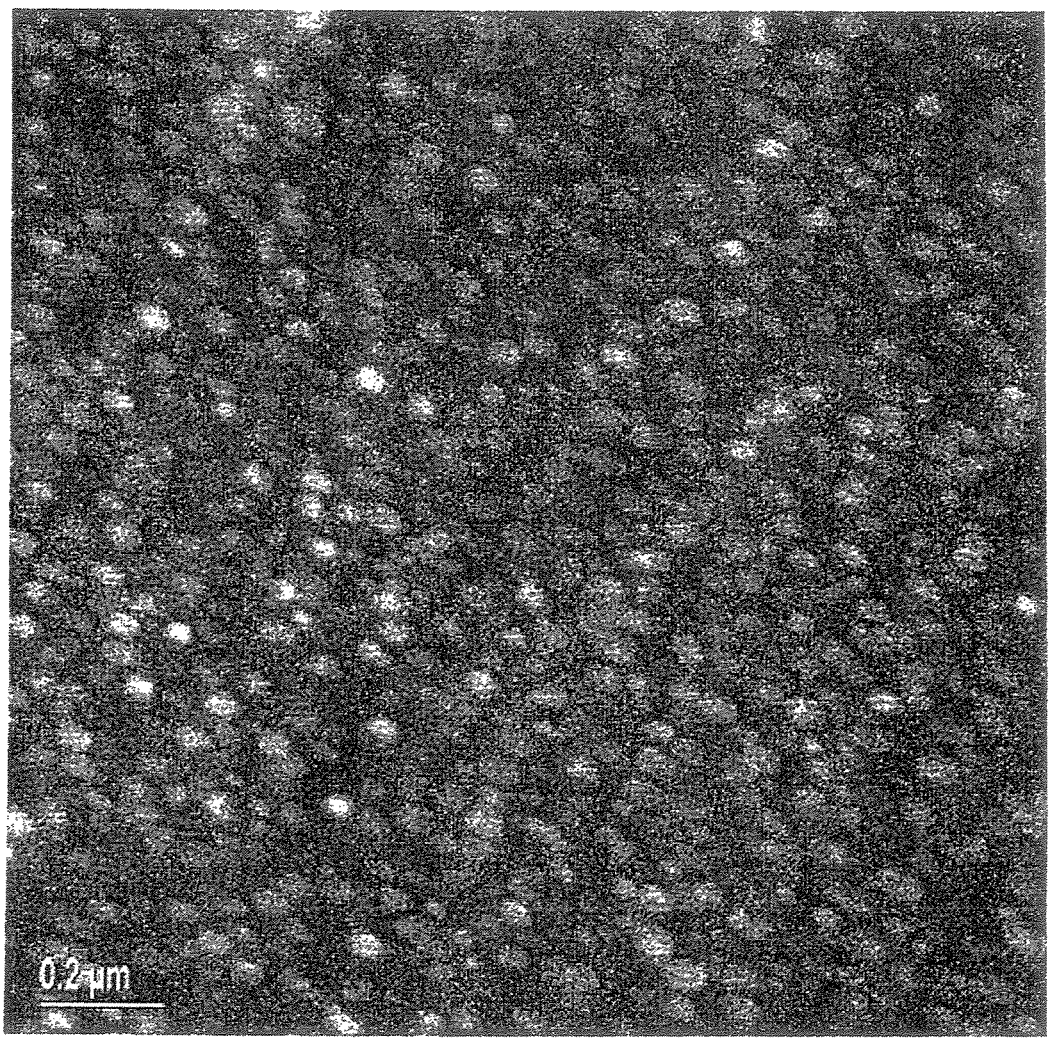
FIG. 1 is a photograph showing a cross section of a cured film prepared in Example 8.

A transparent cured film according to the invention comprises organic fine particles having an ultraviolet absorbing group and an average particle diameter of 1 to 200 nm, the particles being dispersed in a matrix having an Si—O bond, and having a transmittance of visible light of 80% or more and a haze value of 10% or less. A cured film with excellent resistance to ultraviolet rays and having high transparency can be obtained by finely dispersing organic fine particles having an ultraviolet absorbing group (e.g. polymer ultraviolet absorber as described later) in the film. It is preferred that the average particle diameter of the organic fine particles be 100 nm or less.

The transmittance of visible light and the haze value are values for a cured film with a thickness of 5 μm.

The particle components may be identified by high-angle annular dark-field (HAADF) elemental analysis.

The transmittance of visible light is defined as the "total amount of light passing through sample/amount of visible light incident on sample", and expressed as a percentage. The transmittance of visible light in the invention is preferably 80 to 100%. The term "haze" is defined as the degree of cloudiness of the inside or on the surface of a transparent material. Specifically, the haze is defined as "transmittance of scattered light/transmittance of visible light", and is expressed as a percentage. The haze value in the invention is preferably 0.3 to 10%.

The average particle diameter of the ultraviolet absorber is defined as the mean value obtained by observing the cross section of the thermally-cured film formed on a resin substrate using a transmission electron microscope (TEM), and processing the TEM image using image processing software.

The transparent cured film may be prepared using the following coating composition of the invention, for example. The coating composition of the invention is described below.

The composition of the invention comprises the following components (1) to (6).
(1) alkoxysilane compound or polyalkoxysilane compound
(2) aminosilane compound
(3) epoxysilane compound
(4) polymer ultraviolet absorber
(5) curing catalyst
(6) solvent The alkoxysilane compound (1) is an alkoxysilane compound which does not contain an amino group and an epoxy group. It is preferable to use a bifunctional alkoxysilane, a trifunctional alkoxysilane, or a tetrafunctional alkoxysilane. It is more preferable to use a trifunctional alkoxysilane or a tetrafunctional alkoxysilane. These alkoxysilane compounds may be used either singly or in combination of two or more.

Examples of the trifunctional alkoxysilane include methyltrimethoxysilane, methyltriethoxysilane, ethyltrimethoxysilane, ethyltriethoxysilane, phenyltrimethoxysilane, phenyltriethoxysilane, vinyltrimethoxysilane, vinyltriethoxysilane, γ-methacryloxypropyltrimethoxysilane, 3-isocyanatopropyltrimethoxysilane, blocked isocyanatotrimethoxysilane in which the isocyanate group is blocked with 2-butanoneoxime, and the like.

As examples of the tetrafunctional alkoxysilane, tetramethoxysilane, tetraethoxysilane, tetra-n-propoxysilane, tetraisopropoxysilane, tetra-n-butoxysilane, tetraisobutoxysilane, and the like can be given.

A preferred alkoxysilane compound (1) may be expressed by the following formula (1).

$$(R^1)_m Si(OR^2)_{4-m} \quad (1)$$

wherein $R^1$ is individually an alkyl group having 1 to 4 carbon atoms, a vinyl group, a phenyl group, or an alkyl group having 1 to 3 carbon atoms replaced by a methacryloxy group, $R^2$ is an alkyl group having 1 to 4 carbon atoms, and m is an integer of 0, 1, or 2.

The polyalkoxysilane compound (1) is a compound in which the above-mentioned alkoxysilane compounds are bonded through a siloxane bond (Si—O bond). As specific examples of the polyalkoxysilane compound (1), polyalkoxysilane compounds (alkoxysilicate compounds) such as "Silicate 40", "Silicate 45", "Silicate 48", "M Silicate 51", and "MTMS-A" (manufactured by Tama Chemicals Co., Ltd.) can be given.

The aminosilane compound (amino group-containing silane compound) (2) is an alkoxysilane compound which contains an amino group but does not contain an epoxy group. Specific examples include N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltriethoxysilane, 3-aminopropyltrimethoxysilane, N-methylaminopropyltrimethoxysilane, and the like.

A preferred aminosilane compound (2) may be expressed by the following formula (2).

$$(R^{11})_n Si(OR^2)_{4-n} \quad (2)$$

wherein $R^{11}$ is individually an alkyl group having 1 to 4 carbon atoms, a vinyl group, a phenyl group, or an alkyl group having 1 to 3 carbon atoms which is replaced by one or more groups selected from the group consisting of a methacryloxy group and an amino group, provided that at least one of the $R^{11}$s is an alkyl group having 1 to 3 carbon atoms which is replaced by an amino group, $R^2$ is an alkyl group having 1 to 4 carbon atoms, and n is an integer of 1 or 2.

The epoxysilane compound (epoxy group-containing compound) (3) is an alkoxysilane compound which contains an epoxy group but does not contain an amino group. Specific examples of the epoxysilane compound (3) include 3-glycycloxypropylmethyldiethoxysilane, 3-glycycloxypropyltrimethoxysilane, 2-(3,4-epoxycyclohexyl)ethyltrimethoxysilane, 3-glycycloxypropyltriethoxysilane, and the like.

A preferred epoxysilane compound (3) may be expressed by the following formula (3).

$$(R^{21})_n Si(OR^2)_{4-n} \quad (3)$$

wherein $R^{21}$ is individually an alkyl group having 1 to 4 carbon atoms, a vinyl group, a phenyl group, or an alkyl group having 1 to 3 carbon atoms which is replaced by one or more groups selected from the group consisting of a methacryloxy group, a glycyloxy group, and a 3,4-epoxycyclohexyl group, provided that at least one of the $R^{21}$s is an alkyl group having 1 to 3 carbon atoms which is replaced by a glycyloxy group or a 3,4-epoxycyclohexyl group, $R^2$ is an alkyl group having 1 to 4 carbon atoms, and n is an integer of 1 or 2.

The polymer ultraviolet absorber (4) is a compound having a skeleton serving as an ultraviolet absorber in its molecular chain.

For example, a copolymer of an acrylic monomer having a skeleton serving as an ultraviolet absorber (e.g. benzophenone, benzotriazole, or triazine skeleton) as a side chain with another ethylenically unsaturated compound (e.g. acrylic acid, methacrylic acid, derivative thereof, styrene, or vinyl acetate). In contrast to related-art ultraviolet absorbers which generally have a low molecular weight of 200 to 400, the polymer ultraviolet absorber normally has a weight average molecular weight exceeding 10,000. Due to such a high molecular weight, the polymer ultraviolet absorber is free from problems accompanying related-art low-molecular-weight ultraviolet absorbers, such as poor compatibility with plastic and low heat resistance, and enables a cured film to exhibit weatherability for a long time. The ultraviolet absorber may be in the form of powder, a solution prepared by dissolving the absorber in an organic solvent such as ethyl acetate as a dispersant, an emulsion prepared by dispersing the absorber in water, or the like.

The curing catalyst (5) is a catalyst which allows hydrolyzes and condenses (cures) the silane compounds (1), (2), and (3). Examples of the curing catalyst (5) include inorganic acids such as hydrochloric acid, sulfuric acid, nitric acid, phosphoric acid, nitrous acid, perchloric acid, and sulfamic acid, and organic acids such as formic acid, acetic acid, propionic acid, butyric acid, oxalic acid, succinic acid, maleic acid, lactic acid, p-toluenesulfonic acid, and citric acid.

Also, organic metal salts such as lithium hydroxide, sodium hydroxide, potassium hydroxide, n-hexylamine, dimethylamine, tributylamine, diazabicycloundecene, ethanolamine acetate, dimethylaniline formate, tetraethylammonium benzoate, sodium acetate, potassium acetate, sodium propionate, potassium propionate, sodium formate, potassium formate, benzyltrimethylammonium acetate, tetramethylammonium acetate, and tin octylate, and Lewis acids such as tetraisopropyl titanate, tetrabutyl titanate, aluminum triisobutoxide, aluminum triisopropoxide, aluminum acetylacetonate, $SnCl_4$, $TiCl_4$, and $ZnCl_4$ can be given as the curing catalyst.

Of these curing catalysts (5), organic acids are preferably used since the degree of dispersion can be increased and the transparency of the obtained film can be improved even though the amount of the polymer ultraviolet absorber (4) is increased. In particular, an organic carboxylic acid is preferable, with acetic acid being more preferable.

The curing catalysts may be used either singly or in combination of two or more.

The coating composition of the invention is used in a state in which the coating composition is mixed in water and/or an organic solvent. The solvent (6) used in the invention is not particularly limited insofar as the solvent allows mixing the above components uniformly. As example of the solvent, water, alcohols, aromatic hydrocarbons, ethers, ketones, esters, and the like can be given. Of these organic solvents, specific examples of the alcohol include methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene monomethyl ether acetate, diacetone alcohol, methylcellosolve, ethylcellosolve, propylcellosolve, butylcellosolve, and the like.

Specific examples of other solvents include cyclohexanone, acetone, methyl ethyl ketone, methyl isobutyl ketone, tetrahydrofuran, 1,4-dioxane, 1,2-dimethoxyethane, xylene, dichloroethane, toluene, acetic acid, methyl acetate, ethyl acetate, ethoxyethyl acetate, and the like.

These solvents may be used either singly or in combination of two or more.

The amounts of the components (1) to (6) may be determined appropriately. For example, the components (1) to (6) are used in amounts as follows.

It is preferred to mix the alkoxysilane compound (1) in an amount of 10 to 90 wt % (more preferably 15 to 75 wt %) ((tetrafunctional alkoxysilane: 5 to 50 wt % (more preferably, 10 to 45 wt %), trifunctional alkoxysilane: 5 to 80 wt % (more preferably 5 to 40 wt %)), the aminosilane compound (2) in an amount of 1 to 55 wt % (more preferably 5 to 45 wt %), the epoxysilane compound (3) in an amount of 1 to 60 wt % (more preferably 5 to 45 wt %), the polymer ultraviolet absorber (4) in an amount of 0.1 to 65 wt % (more preferably 0.1 to 50 wt %), and the curing catalyst (5) in an amount of 0.1 to 30 wt % (more preferably 0.1 to 20 wt %).

When the tetrafunctional alkoxysilane is mixed in an amount exceeding 50 wt %, film-forming properties may be lowered (cracks may occur). When the amount of the tetrafunctional alkoxysilane is less than 5 wt %, scratch resistance may deteriorate. When the trifunctional alkoxysilane is mixed in an amount exceeding 80 wt %, scratch resistance may be lowered. When the amount of the trifunctional alkoxysilane is less than 5 wt %, the stability of the coating liquid may deteriorate.

When the aminosilane compound (2) is mixed in an amount exceeding 55 wt %, film-forming properties may be lowered (cracks may occur). When the amount of the aminosilane compound is less than 1 wt %, adhesion, scratch resistance, and the stability of the coating liquid may significantly deteriorate. As for the lower limit of the amount of the aminosilane compound (2), it is preferred to mix the aminosilane compound in an amount of 5 wt % or more to ensure improved scratch resistance, as shown by the following examples. More preferably, the aminosilane compound is mixed in an amount of 10 wt % or more.

When the epoxysilane compound (3) is mixed in an amount exceeding 60 wt %, transparency, adhesion, and scratch resistance of the resulting film and the stability of the coating liquid may deteriorate. When the amount of the epoxysilane compound (3) is less than 1 wt %, film-forming properties may be lowered (cracks may occur). As for the lower limit of the amount of the epoxysilane compound (3), it is preferred that the epoxysilane compound be mixed in an amount of 5 wt % or more to provide improved film-forming properties (cracks do not occur), as shown by the following examples. More preferably, the epoxysilane compound (3) is mixed in an amount of 10 wt % or more.

When the polymer ultraviolet absorber (4) is mixed in an amount exceeding 65 wt %, scratch resistance may be lowered. If the amount of the polymer ultraviolet absorber (4) is less than 0.1 wt %, weatherability may become insufficient.

The amount of the solvent (6) to be mixed is 10 to 1000 parts by weight, preferably 10 to 800 parts by weight, and particularly preferably 50 to 600 parts by weight for 100 parts by weight of the total amount of the components (1) to (5).

As for the mixing ratio of the alkoxysilane compound (1), the aminosilane compound (2), the epoxysilane compound (3), and the polymer ultraviolet absorber (4), it is preferred that the alkoxysilane compound be mixed in an amount of 10 to 80 parts by weight (more preferably 15 to 65 parts by weight) ((tetrafunctional alkoxysilane: 5 to 40 parts by weight (more preferably 10 to 35 parts by weight), trifunctional alkoxysilane: 5 to 80 parts by weight (more preferably 5 to 35 parts by weight)), the aminosilane compound be mixed in an amount of 1 to 60 parts by weight (more preferably 10 to 50 parts by weight), the epoxysilane compound be mixed in an amount of 1 to 70 parts by weight (more preferably 10 to 50 parts by weight), the polymer ultraviolet absorber be mixed in an amount of 0.1 to 50 parts by weight (more preferably 0.1 to 30 parts by weight), the curing catalyst be mixed in an amount of 0.1 to 60 parts by weight (more preferably 0.1 to 50 parts by weight), and the solvent be mixed in an amount of 10 to 1000 parts by weight (more preferably 10 to 800 parts by weight) for 100 parts by weight of nonvolatile components (cured film) in the coating composition.

100 parts by weight of the cured film refers to the total of the amount of the nonvolatile components provided that the components (1), (2), and (3) are completely hydrolyzed and condensed and the amount of the component (4) left after removal of the solvent.

The coating composition of the invention may also include a leveling agent for the cured film and a lubricant. Examples of these additives include a copolymer of polyoxyalkylene and polydimethylsiloxane, a copolymer of polyoxyalkylene and fluorocarbon, and the like.

If necessary, a photostabilizer, a weatherability imparting agent, a colorant, or an antistatic agent may also be added.

The coating composition is prepared by mixing the above components (1) to (6).

It is preferred to prepare a first mixed solution including at least the components (1) and (4), prepare a second mixed solution including at least the components (1), (2), and (3), and mix the first mixed solution and the second mixed solution. It is preferable to separately prepare the mixed solutions since the storage stability of the coating composition is improved (e.g. gelation does not occur). Preferably, the components (5) and (6) are mixed into the first mixed solution.

The coating composition of the invention may be formed into a cured film (cured coating) by curing the composition using a known method.

Specifically, the coating composition is applied to a substrate such as a resin molded product (injection molded product, film, sheet, or the like) on which a cured film is formed using a known method such as spray coating, immersion coating, curtain flow coating, bar coating, or roll coating to form a coating. The thickness of the coating is adjusted so that the cured film has a thickness of preferably 1 to 15 μm, and more preferably 2 to 10 μm.

A cured film is obtained by curing the coating by heating under appropriate curing conditions, normally at 80° C. to 140° C., preferably 110° C. to 140° C. for 30 to 120 minutes.

A transparent cured film obtained from the coating composition of the invention includes organic fine particles (for example, the component (4)) having an ultraviolet absorbing group and an average particle diameter of 1 to 200 nm, and has a transmittance of visible light of 80% or more (preferably 85% or more) and a haze value of 10% or less (preferably 5% or less)

Therefore, a cured film exhibiting excellent resistance to ultraviolet rays and transparency can be obtained.

A matrix having an Si—O bond in which the organic fine particles (component (4)) are dispersed is derived from the components (1), (2), and (3).

In the transparent cured film of the invention, the $SiO_2$-reduced weight derived from Si contained in the cured film is preferably 30 to 80 wt %, and particularly preferably 40 to 80 wt % of the total weight of the cured film. The above range allows a cured film with excellent film-forming properties (cracks do not occur) and scratch resistance to be obtained.

The ratio of $SiO_2$ is determined by subjecting a sample, obtained by thermally curing the coating liquid, to thermogravimetric measurement on a petri dish made of Teflon (registered trademark) (under nitrogen, the temperature is raised at 20° C./min in the range from room temperature to 800° C.) and calculating the ratio of $SiO_2$ from the amount of residue at 800° C.

The volume ratio of the polymer ultraviolet absorber in the cured film is preferably 0.5 to 70 vol %, and particularly preferably 1 to 50 vol %. This volume range provides a cured film with excellent transparency and ultraviolet absorbing capability.

The volume fraction of the polymer ultraviolet absorber is defined as a value obtained by observing the cross section of the thermally-cured film on a resin substrate using a transmission electron microscope (TEM), processing the TEM image using image processing software to obtain an area percentage, and dividing the obtained value by "thickness of the observed sample/average particle diameter".

The coating composition of the invention can be applied to a variety of resin substrates to form a resin multilayer body. In particular, the coating composition of the invention may suitably be applied to polycarbonate resins and polymethyl methacrylate (PMMA).

The polycarbonate resin substrate to which the coating composition is applied is not particularly limited. A polymer is used which is obtained by a known method from a bisphenol compound represented by 2,2-bis(4-hydroxyphenyl)alkane and 2,2-bis(4-hydroxy-3,5-dihalogenophenyl)alkane. The skeleton of the polymer may contain a structural unit derived from a fatty acid diol or a structural unit having an ester bond. The molecular weight of the polymer is not particularly limited. In respect of extrusion moldability and mechanical strength, it is preferred that the viscosity-average molecular weight of the polymer be 10,000 to 50,000, and more preferably 13,000 to 40,000. The thickness of the substrate is not particularly limited, but preferably about 0.1 to 20 mm. It is preferred that the polycarbonate resin substrate be transparent.

If necessary, the resin substrate may contain additives such as an ultraviolet absorber, an antioxidant, a heat stabilizer, a flame retardant, an inorganic filler, an antistatic agent, and a heat ray blocking agent.

In the case of a polycarbonate resin multilayer body, it is preferred to use a polycarbonate resin substrate, on which a polycarbonate resin layer with a thickness of 5 to 100 μm, which contains 1 to 10 parts by weight and preferably 1 to 5 parts by weight of an ultraviolet absorber for 100 parts by weight of the polycarbonate resin is provided on the surface, in order to further improve weatherability. As the ultraviolet absorber used, known ultraviolet absorbers such as benzotriazole absorbers, benzophenone absorbers, phenyl salicylate absorbers, and triazine absorbers can be given. Generally, the triazole absorbers are used.

There are no restrictions on the method of providing the polycarbonate resin layer containing an ultraviolet absorber on the polycarbonate resin substrate. It is preferred that the polycarbonate resin layer be provided by a co-extrusion method in which a polycarbonate resin and a polycarbonate resin containing an ultraviolet absorber are simultaneously extruded in a molten state to form a sheet.

The resin multilayer body of the invention has a double layer structure of a resin substrate and a coating layer. As long as the effects of the invention are not impaired, other layers may be appropriately provided.

EXAMPLES

The following components and the like were used in the examples and comparative examples.
Component (1)
MTMS-A (trifunctional polyalkoxysilane compound)
Lot No. 030601 (manufactured by Tama Chemicals Co., Ltd.)
Solid content (nonvolatile components): 67% (from the analysis sheet prepared by the manufacturer)
M Silicate 51 (tetrafunctional polyalkoxysilane compound)
Lot No. 03070 (manufactured by Tama Chemicals Co., Ltd.)
Solid content (nonvolatile components): 51% (from the analysis sheet prepared by the manufacturer)
Component (4)
ULS-383MG (ultraviolet absorbing skeleton: benzophenone type)
ULS-1383MG (ultraviolet absorbing skeleton: benzotriazole type)
ULS-1385MG (ultraviolet absorbing skeleton: benzotriazole type)
All of the above are manufactured by Ipposha Oil Industries Co., Ltd. (water dispersion/solid content: 30%)
Polycarbonate Substrate:
IV2200R (weatherability grade) manufactured by Idemitsu Kosan Co., Ltd. (former Idemitsu Petrochemical Corporation) having a thickness of 3 mm (transmittance of visible light: 90%, haze value: 1%)

Example 1

Preparation of Coating Liquid

A coating liquid was prepared using the components in amounts shown in Table 1.

ULS-383MG (component (4)) and 2-methoxyethanol (component (6)) were placed in a sample tube.

Tetramethoxysilane (component (1)) was added to the resulting mixture dropwise with stirring. Then, a 20% methanol solution of p-toluenesulfonic acid (component (5)) was added dropwise to the mixture, and the components were stirred for 30 minutes. The resulting liquid is referred to as liquid A.

A mixed liquid of methyltrimethoxysilane (component (1)), 3-aminopropyltrimethoxysilane (component (2)), and glycycloxypropyltrimethoxysilane (component (3)) was prepared. The resulting liquid is referred to as liquid B.

The liquid A was slowly added dropwise to the liquid B, and the mixture was stirred for two hours. Subsequently, the mixture was allowed to stand at 25° C. for one week in a dark place.

[Preparation of Resin Multilayer Body]

The coating liquid obtained as described above was applied using a bar coater to the surface of a polycarbonate molded product with a thickness of 3 mm so that the resulting cured film has a thickness of 5 μm. After allowing the liquid to dry for five minutes at room temperature, the liquid was cured at 120° C. for one hour. The physical properties of the transparent multilayer body having the resulting cured film on its surface are shown in Table 1.

[Evaluation Method]
(1) Storage stability of coating composition: The coating composition was airtightly stored at room temperature for one month. The presence or absence of gelation was visually evaluated. A coating composition showing no gelation was subjected to viscosity measurement using a BM-type viscometer manufactured by Tokyo Keiki Co., Ltd. A coating composition of which the change in viscosity was within 20% was evaluated as "Good".
(2) Film appearance: The appearance of the cured film (presence or absence of foreign matter or spot pattern) and the presence or absence of cracks were visually confirmed.
(3) Scratch resistance: The surface of the cured film was rubbed back and forth 10 times with #0000 steel wool at a load of 500 g and a speed of 20 mm/sec. The surface scratch state was visually evaluated according to the following four grades.
1. No scratches
2. Small number of scratches
3. Scratches formed on half the rubbed surface
4. Scratches formed on the entire rubbed surface
(4) Abrasion resistance: Using a CS-10F wear ring, a Taber abrasion test was performed at a load of 500 g and a number of revolutions of 500. The difference ($\Delta H$) between the haze value (H) after the Taber abrasion test and the haze value (H) before the Taber abrasion test was measured, and the abrasion resistance was evaluated. (Haze=Td/Tt×100, Td: transmittance of scattered light, Tt: transmittance of total light)
(5) Adhesion: According to JIS K5400, the sample was cut crosswise (11 times in each direction) using a razor blade at intervals of 2 mm to form 100 squares. Subsequently, a commercially available cellophane adhesive tape (CT-24 (width: 24 mm), manufactured by Nichiban Co., Ltd.) was caused sufficiently to adhere to the surface with the cushion of finger, and then peeled off from the surface at right angles at one time in the forward direction. The number (X) of remaining unpeeled squares was counted and indicated as X/100.
(6) Organic chemical resistance: 1 cc of acetone was dropped onto the cured film. The surface of the cured film was wiped with a cloth after five minutes, and the conditions of the film were visually observed. A film which did not change was evaluated as "Good".
(7) Weatherability: A xenon weatherameter test was performed (Ci165, manufactured by Atlas Corporation, output: 6.5 kW, black panel temperature: 63° C., humidity:

50%). For a sample on which 100 squares were formed in the same manner as in (5), a change in appearance of the cured film (spontaneous peeling and cracks) was visually evaluated. The adhesion of the sample was also evaluated. The number (X) of unchanged squares was counted and indicated as X/100.

(8) Transmittance of visible light and haze value: Using a direct-reading haze computer (HGM-2DP, manufactured by Suga Test Instruments Co., Ltd.), measurement was performed on a multilayer body obtained by forming a cured film on a polycarbonate substrate.

(9) Average particle diameter: The cross section of a thermally-cured film on a resin substrate was observed using a transmission electron microscope (TEM). Ten particles present in a 1 µm×1 µm section were selected at random, and the average diameter of these particles was calculated using free software (NIH Image 1.63, manufactured by National Institutes of Health of the U.S.). The average particle diameter in Example 1 and Examples 2 to 9 described later was 40 to 60 nm.

FIG. 1 is a photograph of the cross section of a cured film prepared in Example 8 (magnification: ×100,000).

(10) Volume fraction of organic fine particles: The cross section of a thermally-cured film on a resin substrate was observed using a transmission electron microscope (TEM). The area of the particles present in a 1.5 µm× 1.5 µm section was calculated using the above-mentioned free software (manufactured by the National Institutes of Health of the U.S.) The obtained value was divided by "thickness of sample/average particle diameter" to determine the volume fraction.

(11) Heat resistance: Using a heat resistance testing machine (PS-222, manufactured by Tabai Espec Corporation), measurement was performed at 110° C. and 720H. For a sample on which 100 squares were formed in the same manner as in (5), a change in appearance of the cured film (spontaneous peeling and cracks) was visually evaluated. The adhesion of the sample was also evaluated. The number (X) of unchanged squares was counted and indicated as X/100.

(12) Resistance to thermal impact: A thermal impact test was performed (using a testing machine TSA-200D-W, manufactured by ESPEC Corp. One cycle: −30° C. for 1 hour, 110° C. for 1 hour). The test was performed for 100 cycles. For a sample on which 100 squares were formed in the same manner as in (5), a change in appearance of the cured film (spontaneous peeling, cracks) was visually evaluated. The adhesion of the sample was also evaluated. The number (X) of unchanged squares was counted and indicated as X/100.

(13) $SiO_2$-Reduced Weight Derived from Si:

The ratio of $SiO_2$ is determined by subjecting a sample, obtained by thermally curing the coating liquid, to thermogravimetric measurement on a petri dish made of Teflon (registered trademark) (under nitrogen, the temperature was raised at 20° C./min. in the range from room temperature to 800° C.) and calculating the ratio of $SiO_2$ from the amount of residue at 800° C.

Examples 2 to 16 and Comparative Examples 1 to 3

The evaluation was performed in the same manner as in Example 1, except that the components and the amounts were changed to those shown in Table 1 or Table 2. The evaluation results are shown in Table 1 and Table 2. In Comparative Example 3, the transmittance of visible light and the haze value could not be measured.

The ratio of each component (parts by weight), provided that the total of the calculated amount of nonvolatile components when the components (1), (2), and (3) are completely hydrolyzed and condensed and the amount of the component (4) remaining after removal of the solvent is 100 parts by weight, is shown in Table 3 and Table 4.

The volume fraction of the organic fine particles in the cured film prepared in Example 8 was 23 vol %, and the $SiO_2$-reduced weight derived from Si was 45 wt %.

TABLE 1

| | Component | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Liquid A | Tetramethoxysilane | (1) | 2 g | | 2 g | 2 g | 2 g | 2 g | 2 g | 2 g | 2 g | 2 g |
| | M Silicate51 | (1) | | 1.5 g | | | | | | | | |
| | ULS-383MG | (4) | 0.3 g | 0.3 g | 0.3 g | 0.7 g | | | | | | |
| | ULS-1383MG | (4) | | | | | 0.7 g | | | | | |
| | ULS-1385MG | (4) | | | | | | 0.7 g | 0.7 g | 2.8 g | 6.3 g | 2.8 g |
| | 20% methanol solution of p-toluene sulfonic acid | (5) | 0.1 g | 0.1 g | 0.1 g | 0.1 g | 0.1 g | 0.1 g | 0.1 g | 0.1 g | 0.1 g | 0.1 g |
| | Acetic acid | (5) | | | | | | | | 1.5 g | 1.5 g | 1.5 g |
| | 2-Methoxyethanol | (6) | 1 g | 5 g | 5 g | 5 g | 5 g | 3 g | | | | |
| | 1-Methoxy-2-propanol | (6) | | | | | | | 10 g | 10 g | 10 g | 10 g |
| | Water | (6) | | | | | | | | | | |
| Liquid B | Methyltrimethoxysilane | (1) | 2 g | 2 g | | 2 g | 2 g | 2 g | 2 g | 2 g | 2 g | 2 g |
| | MTMS-A | (1) | | | 1.5 g | | | | | | | |
| | 3-Aminopropyltrimethoxysilane | (2) | 2 g | 2 g | 2 g | 2 g | 2 g | 2 g | 2 g | 2 g | 2 g | 1.6 g |
| | Glycydoxypropyltrimethoxysilane | (3) | 2 g | 2 g | 2 g | 2 g | 2 g | 2 g | 2 g | 2 g | 2 g | 2.5 g |
| Evaluation | Liquid stability | | Good | Good | Good | Good | Good | Good | Good | Good | Good | Good |
| | Appearance of film | | Good | Good | Good | Good | Good | Good | Good | Good | Good | Good |
| | Transmittance of visible light | | 90% | 90% | 90% | 90% | 90% | 90% | 90% | 90% | 90% | 90% |
| | Haze value | | 1% | 1% | 1% | 1% | 1% | 1% | 1% | 1% | 1% | 1% |
| | Scratch resistance | | 1 | 1 | 1 | 1 | 1 | 1 | 1 | 1 | 2 | 1 |
| | Abrasion resistance (ΔH) | | 1 to 2 | 1 to 2 | 1 to 2 | 1 to 2 | 1 to 2 | 1 to 2 | 1 to 2 | 10 | 20 | 10 |
| | Adhesion | | 100/100 | 100/100 | 100/100 | 100/100 | 100/100 | 100/100 | 100/100 | 100/100 | 100/100 | 100/100 |
| | Solvent resistance | | Good | Good | Good | Good | Good | Good | Good | Good | Good | Good |
| | Weatherability (180 hrs) | | 100/100 | 100/100 | 100/100 | 100/100 | 100/100 | 100/100 | 100/100 | 100/100 | 100/100 | 100/100 |
| | Weatherability (420 hrs) | | | | | 100/100 | 100/100 | 100/100 | 100/100 | 100/100 | 100/100 | 100/100 |
| | Weatherability (600 hrs) | | | | | | 100/100 | 100/100 | 100/100 | 100/100 | 100/100 | 100/100 |
| | Weatherability (1020 hrs) | | | | | | | 100/100 | 100/100 | 100/100 | 100/100 | 100/100 |

TABLE 1-continued

| Component | Example 1 | Example 2 | Example 3 | Example 4 | Example 5 | Example 6 | Example 7 | Example 8 | Example 9 | Example 10 |
|---|---|---|---|---|---|---|---|---|---|---|
| Heat resistance | 100/100 | 100/100 | 100/100 | 100/100 | 100/100 | 100/100 | 100/100 | 100/100 | 100/100 | 100/100 |
| Resistance to thermal impact | 100/100 | 100/100 | 100/100 | 100/100 | 100/100 | 100/100 | 100/100 | 100/100 | 100/100 | 100/100 |

TABLE 2

| Component | | Example 11 | Example 12 | Example 13 | Example 14 | Example 15 | Example 16 | Comparative Example 1 | Comparative Example 2 | Comparative Example 3 |
|---|---|---|---|---|---|---|---|---|---|---|
| Tetramethoxysilane | (1) | 2 g | 2 g | 2 g | 2 g | 2 g | 2 g | 2 g | 2 g | 2 g |
| M Silicate51 | (1) | | | | | | | | | |
| ULS-383MG | (4) | | | | | | | None | | |
| ULS-1383MG | (4) | | | | | | | None | 0.7 g | 0.7 g |
| ULS-1385MG | (4) | 2.8 g | 2.8 g | 2.8 g | 2.8 g | 2.8 g | 2.8 g | None | | |
| 20% methanol solution of p-toluene sulfonic acid | (5) | 0.1 g | 0.1 g | 0.1 g | 0.1 g | 0.1 g | 0.1 g | 0.1 g | 0.1 g | 0.1 g |
| Acetic acid | (5) | 1.5 g | 1.5 g | 1.5 g | 1.0 g | 0.5 g | 0.5 g | | | |
| 2-Methoxyethanol | (6) | | | | | | | 1 ml | 5 ml | 5 ml |
| 1-methoxy-2-propanol | (6) | 10 g | 10 g | 10 g | 10 g | 10 g | 10 g | | | |
| Water | (6) | | 2 g | 2 g | 2 g | 3 g | 3 g | | | |
| Methyltrimethoxysilane | (1) | 2 g | 2 g | 2 g | 2 g | 2 g | 2 g | 2 g | 2 g | 2 g |
| MTMS-A | (1) | | | | | | | | | |
| 3-Aminopropyltrimethoxysilane | (2) | 1.8 g | 2 g | 0.8 g | 0.8 g | 1 g | 1 g | 2 g | None | 2 g |
| Glycydoxypropyltrimethoxysilane | (3) | 2.3 g | 2 g | 2 g | 2 g | 2 g | 2.6 g | 2 g | 2 g | None |
| Liquid stability | | Good | Good | Good | Good | Good | Good | Good | Good | Good |
| Appearance of film | | Good | Good | Good | Good | Good | Good | Good | Good | Cracks |
| Transmittance of visible light | | 90% | 90% | 90% | 90% | 90% | 90% | 90% | 85% | Unmeasurable |
| Haze value | | 1% | 1% | 1% | 1% | 1% | 1% | 1% | 15% | Unmeasurable |
| Scratch resistance | | 1 | 1 | 1 | 1 | 1 | 1 | 1 | 4 | Unmeasurable |
| Abrasion resistance (ΔH) | | 10 | 10 | 10 | 10 | 10 | 10 | 1 to 2 | — | Unmeasurable |
| Adhesion | | 100/100 | 100/100 | 100/100 | 100/100 | 100/100 | 100/100 | 100/100 | — | Unmeasurable |
| Solvent resistance | | Good | Good | Good | Good | Good | Good | Good | — | Unmeasurable |
| Weatherability (180 hrs) | | 100/100 | 100/100 | 100/100 | 100/100 | 100/100 | 100/100 | 0/100 | — | Unmeasurable |
| Weatherability (420 hrs) | | 100/100 | 100/100 | 100/100 | 100/100 | 100/100 | 100/100 | — | — | Unmeasurable |
| Weatherability (600 hrs) | | 100/100 | 100/100 | 100/100 | 100/100 | 100/100 | 100/100 | — | — | Unmeasurable |
| Weatherability (1020 hrs) | | 100/100 | 100/100 | 100/100 | 100/100 | 100/100 | 100/100 | — | — | Unmeasurable |
| Heat resistance | | 100/100 | 100/100 | 100/100 | 100/100 | 100/100 | 100/100 | — | — | Unmeasurable |
| Resistance to thermal impact | | 100/100 | 100/100 | 100/100 | 100/100 | 100/100 | 100/100 | Cracks Unmeasurable | — | Unmeasurable |

TABLE 3

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Component (1) Tetrafunctional alkoxysilane component | 18 | 17 | 17 | 17 | 17 | 17 | 17 | 15 | 13 | 15 |
| Component (1) Trifunctional alkoxysilane component | 22 | 22 | 22 | 21 | 21 | 21 | 21 | 19 | 16 | 18 |
| Component (2) | 27 | 27 | 27 | 27 | 27 | 27 | 27 | 23 | 20 | 18 |
| Component (3) | 31 | 32 | 31 | 31 | 31 | 31 | 31 | 27 | 22 | 33 |
| Component (4) | 2 | 2 | 2 | 5 | 5 | 5 | 5 | 16 | 30 | 16 |

TABLE 4

| | Example 11 | Example 12 | Example 13 | Example 14 | Example 15 | Example 16 | Comparative Example 1 | Comparative Example 2 | Comparative Example 3 |
|---|---|---|---|---|---|---|---|---|---|
| Component (1) Tetrafunctional alkoxysilane component | 15 | 15 | 17 | 17 | 17 | 16 | 18 | 23 | 25 |
| Component (1) Trifunctional alkoxysilane component | 18 | 19 | 22 | 22 | 21 | 19 | 22 | 29 | 31 |

TABLE 4-continued

|  | Example 11 | Example 12 | Example 13 | Example 14 | Example 15 | Example 16 | Comparative Example 1 | Comparative Example 2 | Comparative Example 3 |
|---|---|---|---|---|---|---|---|---|---|
| Component (2) | 21 | 23 | 11 | 11 | 13 | 12 | 28 | 0 | 38 |
| Component (3) | 30 | 27 | 31 | 31 | 30 | 36 | 32 | 42 | 0 |
| Component (4) | 16 | 16 | 19 | 19 | 18 | 17 | 0 | 6 | 7 |

In Table 3 and Table 4, the value shown indicates the amount (parts by weight) of each component provided that the total mass of the components is 100 parts by weight.

The values are rounded off to the nearest whole number.

INDUSTRIAL APPLICABILITY

The invention can be applied to a variety of polycarbonate materials including automotive interior parts such as meter covers, windshields for bicycles or tricycles, vehicle windows, roofs for construction equipment, protection glasses, protection shields, and building windows.

The invention claimed is:
1. A coating composition comprising:
(1) 10 to 90 wt % of at least one alkoxysilane compound represented by formula (1) or at least one polyalkoxysilane compound in which the alkoxysilane compounds represented by formula (1) are bonded through a siloxane bond;
(2) 1 to 55 wt % of an aminosilane compound represented by formula (2);
(3) 1 to 60 wt % of an epoxysilane compound represented by formula (3);
(4) 0.1 to 65 wt % of polymeric ultraviolet absorber particles;
(5) 0.1 to 30 wt % of at least one curing catalyst; and
(6) at least one solvent, wherein
the amount of said at least one solvent is from 10 to 1000 parts by weight for 100 parts by weight of the total amount of components (1) to (5), wherein
the at least one alkoxysilane compound is represented by formula (1):

$$(R^1)_m Si(OR^2)_{4-m} \quad (1)$$

wherein
each $R^1$ is individually an alkyl group having 1 to 4 carbon atoms, a vinyl group, a phenyl group, or an alkyl group having 1 to 3 carbon atoms replaced by a methacryloxy group,
each $R^2$ is an alkyl group having 1 to 4 carbon atoms, and m is an integer of 0, 1, or 2;
the aminosilane compound is represented by formula (2):

$$(R^{11})_n Si(OR^2)_{4-n} \quad (2)$$

wherein
each $R^{11}$ is individually an alkyl group having 1 to 4 carbon atoms, a vinyl group, a phenyl group, or an alkyl group having 1 to 3 carbon atoms replaced by at least one group selected from the group consisting of a methacryloxy group and an amino group, provided that at least one $R^{11}$ group is replaced by an amino group,
each $R^2$ is an alkyl group having 1 to 4 carbon atoms, and n is an integer of 1 or 2; and
the epoxysilane compound is represented by formula (3):

$$(R^{21})_n Si(OR^2)_{4-n} \quad (3)$$

wherein
each $R^{21}$ is individually an alkyl group having 1 to 4 carbon atoms, a vinyl group, a phenyl group, or an alkyl group having 1 to 3 carbon atoms replaced by at least one group selected from the group consisting of a methacryloxy group, a glycydoxy group, and a 3,4-epoxycyclohexyl group, provided that at least one $R^{21}$ group is an alkyl group having 1 to 3 carbon atoms replaced by a glycydoxy group or a 3,4-epoxycyclohexyl group,
each $R^2$ is an alkyl group having 1 to 4 carbon atoms, and n is an integer of 1 or 2.
2. The coating composition according to claim 1, wherein the polymeric ultraviolet absorber particles (4) have a molecular weight of greater than 10 000.
3. The coating composition according to claim 1, wherein the at least one curing catalyst is an organic acid.
4. The coating composition according to claim 1, wherein the at least one curing catalyst is acetic acid.
5. A cured film obtainable by curing the coating composition of claim 1.
6. The cured film according to claim 5 having a transmittance of visible light of 80% or more at a film thickness of 5 μm.
7. The cured film according to claim 5 having a haze value of no greater than 10% at a film thickness of 5 μm.
8. The cured film according to claim 5 having a haze value of from 0.3 to 10% at a film thickness of 5 μm.
9. A cured film obtained by curing the coating composition of claim 1.
10. The cured film according to claim 9 having a transmittance of visible light of 80% or more at a film thickness of 5 μm.
11. The cured film according to claim 9 having a haze value of no greater than 10% at a film thickness of 5 μm.
12. The cured film according to claim 9 having a haze value of from 0.3 to 10% at a film thickness of 5 μm.
13. A method for producing a cured film, comprising: curing the coating composition according to claim 1 by heating.
14. The coating composition according to claim 1, wherein the polymeric ultraviolet absorber particles are organic fine particles having an average particle diameter of from 1 to 200 nm being formed of a copolymer having a weight average molecular weight exceeding 10,000 of an acrylic monomer having a benzophenone skeleton, benzotriazole skeleton or a triazine skeleton as a side chain with an ethylenically unsaturated compound selected from the group consisting of acrylic acid, methacrylic acid, a derivative of acrylic acid, a derivative of methacrylic acid, styrene and vinyl acetate.
15. A method for producing a coating composition comprising mixing:
(1) at least one alkoxysilane compound represented by formula (1) or at least one polyalkoxysilane compound in which the alkoxysilane compounds represented by formula (1) are bonded through a siloxane bond;

(2) an aminosilane compound represented by formula (2);
(3) an epoxysilane compound represented by formula (3);
(4) polymeric ultraviolet absorber particles;
(5) at least one curing catalyst; and
(6) at least one solvent, wherein the at least one alkoxysilane compound is represented by formula (1):

$$(R^1)_m Si(OR^2)_{4-m} \qquad (1)$$

wherein
each $R^2$ is individually an alkyl group having 1 to 4 carbon atoms, a vinyl group, a phenyl group, or an alkyl group having 1 to 3 carbon atoms replaced by a methacryloxy group,
each $R^2$ is an alkyl group having 1 to 4 carbon atoms, and m is an integer of 0, 1, or 2;
the aminosilane compound is represented by formula (2):

$$(R^{11})_n Si(OR^2)_{4-n} \qquad (2)$$

wherein
each $R^{11}$ is individually an alkyl group having 1 to 4 carbon atoms, a vinyl group, a phenyl group, or an alkyl group having 1 to 3 carbon atoms replaced by at least one group selected from the group consisting of a methacryloxy group and an amino group, provided that at least one $R^{11}$ group is replaced by an amino group,
each $R^2$ is an alkyl group having 1 to 4 carbon atoms, and n is an integer of 1 or 2; and
the epoxysilane compound is represented by formula (3):

$$(R^{21})_n Si(OR^2)_{4-n} \qquad (3)$$

wherein
each $R^{21}$ is individually an alkyl group having 1 to 4 carbon atoms, a vinyl group, a phenyl group, or an alkyl group having 1 to 3 carbon atoms replaced by at least one group selected from the group consisting of a methacryloxy group, a glycydoxy group, and a 3,4-epoxycyclohexyl group, provided that at least one $R^{21}$ group is an alkyl group having 1 to 3 carbon atoms replaced by a glycydoxy group or a 3,4-epoxycyclohexyl group,
each $R^2$ is an alkyl group having 1 to 4 carbon atoms, and n is an integer of 1 or 2.

16. The method according to claim 15, further comprising:
a first mixing of at least components (1) and (4) to form a first solution;
a second mixing of at least components (1), (2) and (3) to form a second solution; and
mixing said first solution and said second solution.

17. The method according to claim 16, wherein components (5) and (6) are present in said first solution.

18. The method according to claim 15, further comprising:
condensing said at least one alkoxysilane compound represented by formula (1), said aminosilane compound represented by formula (2), and said an epoxysilane compound represented by formula (3) to obtain a siloxane matrix.

19. A coating comprising:
100 parts by weight of a cured matrix comprising units of alkoxysilanes represented by formula (1), units of aminosilanes represented by formula (2), and units of epoxysilanes represented by formula (3); and
0.1 to 50 dispersed within parts by weight of polymeric ultraviolet absorber particles said cured matrix, wherein
the alkoxysilane compounds are represented by formula (1):

$$(R^1)_m Si(OR^2)_{4-m} \qquad (1)$$

wherein
each $R^1$ is individually an alkyl group having 1 to 4 carbon atoms, a vinyl group, a phenyl group, or an alkyl group having 1 to 3 carbon atoms replaced by a methacryloxy group,
each $R^2$ is an alkyl group having 1 to 4 carbon atoms, and m is an integer of 0, 1, or 2;
the aminosilane compounds are represented by formula (2):

$$(R^{11})_n Si(OR^2)_{4-n} \qquad (2)$$

wherein
each $R^{11}$ is individually an alkyl group having 1 to 4 carbon atoms, a vinyl group, a phenyl group, or an alkyl group having 1 to 3 carbon atoms replaced by at least one group selected from the group consisting of a methacryloxy group and an amino group, provided that at least one $R^{11}$ group is replaced by an amino group,
each $R^2$ is an alkyl group having 1 to 4 carbon atoms, and n is an integer of 1 or 2 ; and
the epoxysilane compounds are represented by formula (3):

$$(R^{21})_n Si(OR^2)_{4-n} \qquad (3)$$

wherein
each $R^{21}$ is individually an alkyl group having 1 to 4 carbon atoms, a vinyl group, a phenyl group, or an alkyl group having 1 to 3 carbon atoms replaced by at least one group selected from the group consisting of a methacryloxy group, a glycydoxy group, and a 3,4-epoxycyclohexyl group, provided that at least one $R^{21}$ group is an alkyl group having 1 to 3 carbon atoms replaced by a glycydoxy group or a 3,4-epoxycyclohexyl group,
each $R^2$ is an alkyl group having 1 to 4 carbon atoms, and n is an integer of 1 or 2.

* * * * *